Oct. 24, 1944.　　　R. B. RANSOM　　　2,361,239
FISHING REEL
Filed April 28, 1943　　　2 Sheets-Sheet 1

Inventor:
Robert B. Ransom,
by Harry E. Dunham
His Attorney.

Inventor:
Robert B. Ransom,
by Harry E. Dunham
His Attorney.

Patented Oct. 24, 1944

2,361,239

UNITED STATES PATENT OFFICE 2,361,239

FISHING REEL

Robert B. Ransom, Hartford, Conn., assignor to General Electric Company, a corporation of New York Application April 28, 1943, Serial No. 484,897

15 Claims. (Cl. 242—84.5)

This invention relates to improvements in fishing reels and more particularly to an improved type of fishing reel having magnetic means for preventing the overrunning of the fishing reel spool. This is a continuation-in-part of my copending application Serial No. 453,533, filed August 4, 1942, now abandoned, and assigned to the same assignee as the present application.

It is an object of my invention to provide a new and improved fishing reel.

It is another object of my invention to provide a fishing reel including new and improved means of simple construction for minimizing backlash or overrunning of the spool and consequent tangling of the line during casting or paying out the line from the spool.

It is a further object of my invention to provide a fishing reel having a new and improved brake or drag means which does not depend on friction and hence is not subject to mechanical wear and is thus adapted for long service.

Another object of my invention is to provide a new and improved brake or drag means for fishing reels which is substantially unaffected by weather conditions as temperature changes, for example.

It is still another object of my invention to provide a fishing reel having a new and improved adjustable brake or drag means which is quiet and smooth in operation and which is readily adjustable to desired degrees of drag or braking effect.

It is still another object of my invention to provide a fishing reel with magnetic drag or braking means.

Further objects and advantages of my invention will become apparent as the following description proceeds and the features of novelty which characterize my invention will be pointed out with particularity in the claims annexed to and forming a part of this specification.

Figure 1:
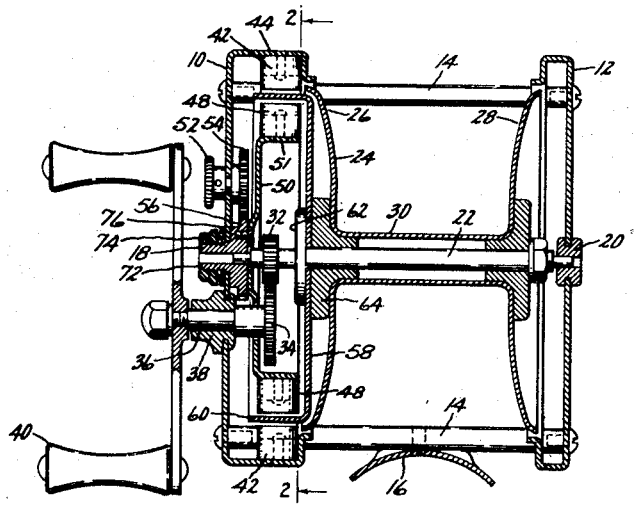
Figure 2:
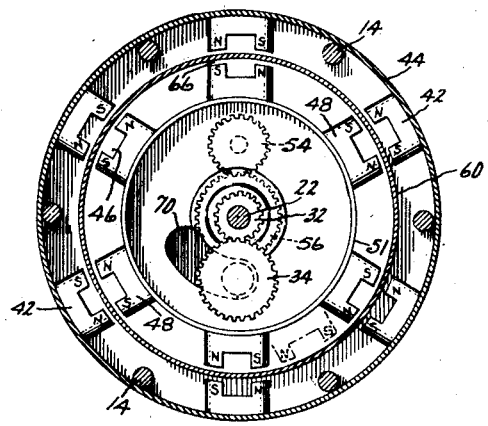
Figure 3:
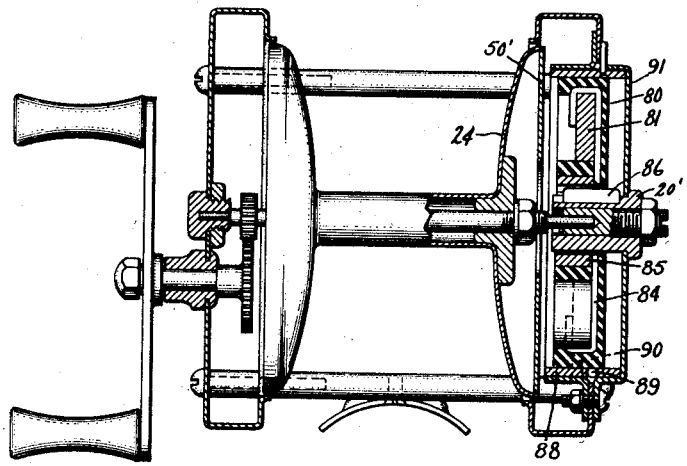
Figure 4:
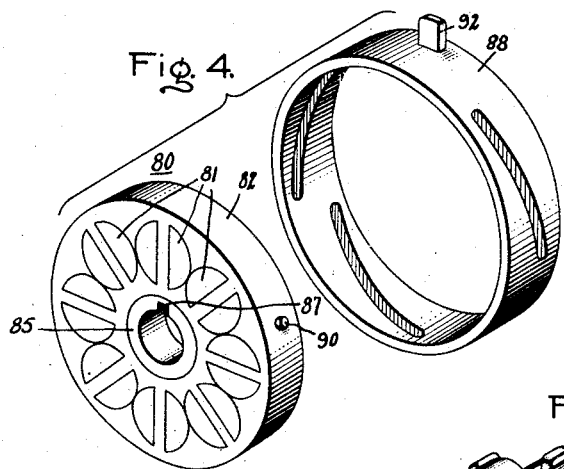
Figure 5:
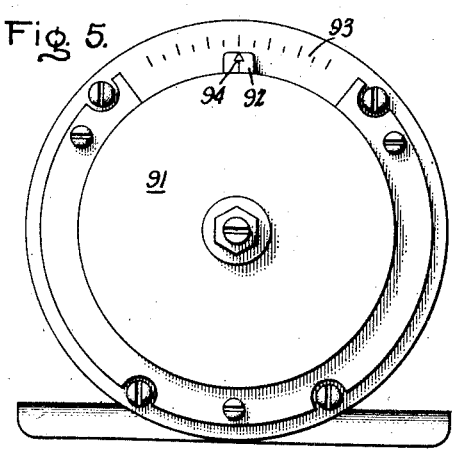
Figure 6:
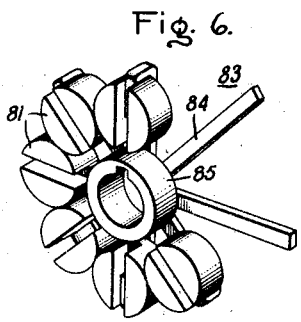

For a better understanding of my invention, reference may be had to the accompanying drawings in which Fig. 1 represents a longitudinal elevational view, with portions broken away, of a reel constructed in accordance with one form of my invention; Fig. 2 is an end elevational view in cross section taken along the line 2—2 of Fig. 1; Fig. 3 is a different embodiment of my invention; and Figs. 4, 5, and 6 illustrate details of the reel and brake shown in Fig. 3.

Referring to Fig. 1, there is shown a reel comprising a frame consisting of a pair of cheek or end plates 10 and 12 which are secured in proper spaced relation by a plurality of cross-connecting rods or bolts 14, located at intervals around the periphery of the end plates. The frame is provided with a mounting piece 16 of suitable construction and which may be mounted on one of the rods 14 and adapted to be secured to the fishing rod by the usual slidable retaining band.

Suitably arranged in the end portions 10 and 12 of the frame are bearing elements 18 and 20, respectively, within which are journaled the opposite end portions of a rotary shaft 22. There is provided a spool 24, which is preferably composed of a light weight non-magnetic material such as aluminum or a phenolic condensation product having flangelike end portions 26 and 28 and an intermediate cylindrical hub portion 30 on which is wound the fishing line. In the illustrative form of fishing reel, the spool or bobbin 24 is mounted on the rotary shaft 22 in a suitable manner for rotation with the shaft.

In order to impart rotation to the shaft 22 and, consequently, to the spool 24 for winding up the line, I have shown a pinion gear 32 which is secured to the shaft 22 and which is adapted to cooperate with a main driving gear 34, the latter element being positioned on a shaft 36 which is journaled in a bearing element 38 of the end frame or plate 10. A balanced operating lever or handle 40 which is suitably secured to the shaft 36 provides means for imparting rotation to the main driving gear 34.

In the form of my invention illustrated in Figs. 1 and 2, I have provided two sets of permanent magnets. One set comprises a plurality of magnets 42 suitably carried by the end plate 10 as by means of a laterally extending flange 44. The magnet elements 42 are preferably evenly spaced apart, even in number, disposed radially of the hub 30, and directed inwardly. The magnets may be substantially U-shaped and conveniently formed by providing a slot or groove 46 across one of the end faces of a short cylindrical member. As best seen in Fig. 2, I may use six magnets 42 in which case the spacing between adjacent magnets will be sixty degrees.

The second set of magnets comprises a plurality of magnet elements 48, preferably the same in number as utilized in the first set and of the same construction. The magnet elements 48 are disposed radially of the hub 30 and in spaced-apart opposed relationship with respect to the magnet elements 42 as by means of a member 50 suitably secured to the supporting framework, as to the bushing 18 by suitable threaded fastening means. The member 50 may have a lateral flange 51 to support the magnet members 48 so that all pole faces are equally spaced from the pole faces of the other set of magnet elements. In order to provide a braking effect on the reel spool, there is provided a braking member 58 of electrically conductive material such as copper or aluminum having a portion, as a flange 60, disposed in the air gap 66 between the sets of magnet elements. The member 58 may be suitably supported for rotation on shaft 22 as by means of portion or shoulder 62 and wedging or clamping member 64.

It will be understood that, as flange 60 moves through the magnetic fields existing in the gap 66, eddy currents will be set up in the member 58 which tend to brake rotation so that, whenever a rotation-producing force is no longer present, the spool will rapidly slow down and overrunning will be substantially prevented.

In operation as a casting reel, it will be appreciated that, as the weight and the lure are cast out, the line is paid out from the spool 24 because of the rotation of the spool and during this casting operation the magnet elements exert a drag or braking effect on the braking element or member 58, which minimizes free running of the spool 24 and backlash. I have thus provided a fishing reel with a braking mechanism of simple construction and one which will last almost indefinitely because of the employment of a braking mechanism which undergoes little or no mechanical wear. Similarly, the principle may be applied to a fly-rod reel by gearing up the reel so that sufficient speed of the eddy current member is available to utilize the braking effect.

For maximum braking effect, the slot or groove between the magnet poles should extend at right angles to the direction of movement of the member 58. In other words, the magnetic axis through the north and south poles should be parallel to the direction of movement. Moreover, the flange 60 preferably should overlap or extend beyond the magnets, the member 58 should have as large a diameter as is practicable, as many magnets as possible should be used, and the maximum possible pole surface and the smallest practicable air gap should be provided. Moreover, it will be understood that, for a given arrangement embodying the above factors, the maximum braking effect will be obtained when the magnet elements are positioned with opposite poles of opposite polarity and minimum effect obtained when opposite poles are of like polarity.

Means is provided for varying the retarding force or drag on the spool 24. The adjusting means comprises an adjusting member or knob 52 carried by the plate 10 and having a pinion gear 54 engaging the pinion 56 which is carried by the bearing portion 18.

In order to permit rotation of pinion 56, the bearing portion 18 may be suitably journaled in the plate 10. For illustrative purposes, I have shown an extension 72 from portion 18 projecting through a suitable opening in the plate 10. The outer end of the extension is threaded for the reception of a nut 74. In order to prevent loosening of the nut and frictionally to retain the pinion 56 in the desired position, I may use a lock washer 76.

By turning the knob 52, the member 50 is caused to rotate with respect to plate 10 and, consequently, relative motion between the sets of magnets is caused so that the inner set may be moved from a position, such as shown in Figs. 1 and 2, where oppositely magnetized poles are opposed, and the braking or drag effect is a maximum, to a position in which the inner magnets are intermediate the outer magnets, as indicated by the dot-dash line in Fig. 2, at which position the braking effect is substantially less. Because of the well-known principle that like poles repel, the positions of the inner magnets should be reversed from the positions of the outer magnets. In other words, if the outer magnets, as viewed in Fig. 2, are arranged with the north pole on the left, the inner magnets should be arranged so that the north pole is on the right so that, when one set of magnets is moved, the movement will bring like magnetized poles opposite each other at one position of the magnets and, in the intermediate position, the nearest adjacent poles will have like polarities.

In order to permit movement of the member 50 with respect to the pinion 34, there is provided a suitably shaped slot 70 in the member 50 through which extends hub portion 37 of the pinion 34, thereby permitting the member 50 to be shifted a predetermined amount about the shaft 22 without affecting operation of the spool rotating mechanism. Any suitable means may be employed for retaining the adjusting means in position. In the illustrative form of my invention, friction is relied upon for this purpose. If desired, other means may be substituted as, for example, suitable projections on the member 52 engaging suitable depressions in end portion 10. Means may also be provided for indicating the position of the brake.

In the construction of the permanent magnets, I prefer to employ a magnetic material which is characterized by a relatively high coercive force as compared, for example, to chrome steel, the coercive force of which ranges from 60 to 65 oersteds. While it is not my intention that this invention shall be limited to the employment of a particular magnetic material, highly satisfactory results may be obtained by the use of permanent magnet alloys containing iron, nickel, and aluminum as the basic or essential ingredients. Alloys of this character for the production of permanent magnets are well known and magnets composed of such material not only have a high coercive force but also exhibit a fairly high residual induction with the result that they are capable of producing a maximum amount of magnetic energy with a minimum volume of magnetic material. They are highly resistant to demagnetizing influences and have the capacity for maintaining their magnetic quality for an almost indefinite period of time. The foregoing magnetic qualities combined with the dimensional characteristic referred to render such alloys ideally suited for the present application because of the limited space available for mounting the magnet elements and the more or less carefree usage to which fishing reels are ordinarily subjected. Furthermore, by the use of magnets composed of such materials, the efficiency of the braking element will remain high throughout the life of the reel.

In Fig. 3 there is shown a different embodiment of my invention in which a single set of magnets is provided, disposed on only one side of the eddy current member 50'. In this form of my invention the magnet assembly 80 may comprise permanent magnets 81 of the same form and material as disclosed in the above described embodiment of my invention. Instead of employing a cup-shaped member 50 for the eddy current member, there is illustrated the use of an annular member of non-magnetic electrically-conductive material such as copper which may be suitably secured to one end of a spool 24. In this embodiment of my invention the braking or drag effect is obtained by varying the air gap between the magnets 81 and the eddy current member 50'. It will be noted that the magnet assembly is disposed on the opposite end of the reel from that illustrated in Figs. 1 and 2.

As best seen in Fig. 4 the magnet assembly 80 comprises a plurality of magnets 81 molded or otherwise suitably carried by a supporting member 82. In this form of my invention it is preferable that like poles be closely adjacent and even touching at the peripheries thereof. With this arrangement the repulsion effect between the adjacent like poles tends to "crowd" the magnetic field so as to cause the lines of force to project further away from the magnet faces and thereby be utilized more effectively.

Magnets do not tend to remain in position with like poles closely adjacent. Therefore, in order to render easy the assembly of the magnets there is shown the use of a spider or supporting mechanism 83 comprising a plurality of arms 84 extending outwardly from a common central location such as a supporting ring 85. The ends of the arms of the spider or supporting member may be folded up and back through the pole face slots as best seen in Fig. 6 so that the arms 84 serve to hold the assembly with the magnet poles properly oriented. The supporting means should be of non-magnetic material, as for example brass. In order to improve the appearance of the magnet assembly, I propose to mold a suitable plastic about the above described assembly. This may be accomplished by placing the magnets face down on the bottom surface of a suitable mold and then filling the mold with a suitable plastic. The above described procedure insures disposition of the magnet faces in a common plane and inasmuch as the pole face slots are filled with plastic, the magnets are well secured and a smooth surface is presented to the eddy current member 50'.

Means has been provided in this form of my invention for preventing the magnets from rotating. This may be accomplished by providing a key 86 on the bearing assembly 20' adapted to engage a slot 87 in the inner surface of the ring 85 whereby the magnet assembly 80 is reciprocably supported on the bearing assembly 20'.

In order to adjust the air gap between the pole faces and the eddy current member 50' there is provided a cylindrical ring or sleeve 88 having a plurality of slots or depressions on the inner surface of the sleeve 88 extending diagonally across the inner face of the ring. In Fig. 4 there are shown three such slots cut through the ring. The outer edge of the magnet assembly 80 is provided with a pin 90 corresponding to each slot 89. During the assembly of the mechanism shown in Fig. 3 the magnet assembly 80 is positioned within the ring 88 with the pins 90 extending into the slots 89. It is clear that if the assembly 80 and the ring 88 are rotated relative to each other, the magnet assembly will move toward or away from the eddy current member 50' depending upon the direction of rotation of the ring. This follows because the magnet assembly 80 is fixed against rotation so that as the ring 88 is rotated the pins 90 are forced to travel back and forth in the slots 89 depending upon the direction of rotation of the sleeve or ring.

The sleeve 88 may be retained in operative position in any suitable manner as by means of a cup member 91 suitably secured to the end of the reel. With this arrangement there is provided a lateral portion 92 extending beyond the periphery of the cup member 91 to enable adjustment of the magnet assembly.

In order to apprize the user of the device of the relative position of the magnet assembly and the eddy current member there may be provided reference indicia on the end of the reel, as indicated by the numeral 93, and a suitable reference mark, as indicated by the arrow 94, may be provided on the control member or portion 92.

While I have shown two specific embodiments of my invention, modifications will be apparent to those skilled in the art. For example, while it is believed preferable to provide an adjustable air gap, it will be obvious that it is within the scope of my invention to provide an arrangement such in which no adjustment is provided. Moreover, any desired number of magnets may be employed and the magnets may be arranged in any desired positions.

While I have shown and described a particular embodiment of my invention, it will be obvious to those skilled in the art that changes and modifications may be made without departing from my invention in its broader aspects, and I, therefore, aim in the appended claims to cover all such changes and modifications as fall within the true spirit and scope of my invention.

What I claim as new and desire to secure by Letters Patent of the United States is:

1. A fishing reel provided with a hysteresis brake for minimizing overrunning of the reel, said reel consisting of a spool member, means for rotatably supporting said spool member, a member positioned adjacent said spool member and restrained against rotation, a plurality of permanent magnets composed of high coercive force permanent magnet material carried by one of said members, a member of non-magnetic electrically-conductive material carried by the other of said members and having a portion disposed adjacent said magnets, said magnets cooperating only with said electrically conductive member to produce eddy currents therein and thereby exert a braking force on said spool member.

2. A fishing reel provided with a hysteresis brake for minimizing overrunning of the reel, said reel consisting of a spool member, means for rotatably supporting said spool member, a member positioned adjacent said spool member and restrained against rotation, a plurality of permanent magnets composed of high coercive force permanent magnet material carried by one of said members, a member of non-magnetic electrically-conductive material carried by the other of said members and having a portion disposed adjacent said magnets, said magnets cooperating only with said electrically conductive member to produce eddy currents therein and thereby exert a braking force on said spool member, and means for adjusting the strength of the braking force.

3. A fishing reel provided with a hysteresis brake for minimizing overrunning of the reel, said reel consisting of a spool member, means for rotatably supporting said spool member, a member positioned adjacent said spool member and restrained against rotation, a plurality of permanent magnets composed of high coercive force permanent magnet material carried by one of said members, a member of non-magnetic electrically-conductive material carried by the other of said members and having a portion disposed adjacent said magnets, said magnets cooperating only with said electrically conductive member to produce eddy currents therein and thereby exert a braking force on said spool member, and means for varying the spacing between said magnets and said electrically conductive member.

4. A fishing reel provided with a hysteresis brake for minimizing overrunning of the reel, said reel consisting of a spool member, means for rotatably supporting said spool member, a member positioned adjacent said spool member and restrained against rotation, a plurality of permanent magnets composed of high coercive force permanent magnet material carried by one of said members, said permanent magnets having like poles closely adjacent, a member of non-magnetic electrically-conductive material carried by the other of said members and having a portion disposed adjacent said magnets, said magnets cooperating only with said electrically conductive member to produce eddy currents therein and thereby exert a braking force on said spool member.

5. In combination in a fishing reel having a pair of end plates, a rotatable spool member positioned between said plates, means positioned adjacent said spool and restrained against rotation, two sets of permanent magnets carried by said means in spaced-apart opposed relationship to provide an air gap, and a member of electrically conductive material carried by said rotatable spool member and having a portion disposed in said air gap, whereby as said spool member is rotated eddy currents are produced in said electrically conductive material, thereby providing a braking force effective to minimize overrunning of said spool.

6. In combination a fishing reel comprising a rotatable spool member, and a member positioned adjacent said spool and restrained against rotation, two sets of permanent magnets carried by one of said members in spaced-apart opposed relationship to provide an air gap, and a member of electrically conductive material carried by the other of said members and having a portion disposed in said air gap, whereby as said spool member is rotated eddy currents are produced in said last-mentioned member, thereby providing a braking force effective to minimize overrunning of said spool, and means for adjusting the position of one of said sets of permanent magnets relatively to the other set in order to vary said braking effect.

7. In combination a fishing reel comprising a rotatable spool member, and a member positioned adjacent said spool and restrained against rotation, two sets of permanent magnets carried by said restrained member in spaced-apart opposed relationship to provide an air gap, and a member of electrically conductive material arranged for rotation with said spool member and having a portion disposed in said air gap, whereby as said spool member is rotated eddy currents are set up in said electrically conductive member and a magnetic braking force is produced for minimizing overrunning of said spool.

8. In combination a fishing reel comprising a rotatable spool member, and a member positioned adjacent said spool and restrained against rotation, two sets of permanent magnets carried by said restrained member in spaced-apart opposed relationship to provide an air gap, a member of electrically conductive material arranged for rotation with said spool member and having a portion disposed in said air gap, whereby as said spool member is rotated a magnetic braking effect is produced because of eddy currents set up in said electrically conductive member for minimizing overrunning of said spool, and means for adjusting said sets of permanent magnets relatively to each other to vary said braking effect.

9. In combination a fishing reel comprising a rotatable spool member, and a member positioned adjacent said spool and restrained against rotation, two sets of permanent magnets carried by one of said members in spaced-apart opposed relationship to provide an air gap, and a member of electrically conductive material carried by the other of said members and having a portion disposed in said air gap and extending beyond said magnets on all sides thereof, whereby as said spool member is rotated eddy currents are produced in said last-mentioned member, thereby providing a braking force effective to minimize overrunning of said spool.

10. In combination a fishing reel comprising a rotatable spool member, and a member positioned adjacent said spool and restrained against rotation, two sets of permanent magnets carried by one of said members in spaced-apart opposed relationship to provide an air gap, and a member of electrically conductive material carried by the other of said members and having a portion disposed in said air gap, whereby as said spool member is rotated eddy currents are produced in said last-mentioned member, thereby providing a braking force effective to minimize overrunning of said spool, each of said magnets being disposed so that the magnetic axis is substantially parallel to the direction of movement of said electrically conducting member.

11. A fishing reel provided with a hysteresis brake for minimizing overrunning of the reel, said reel comprising a spool member, means for rotatably supporting said spool member, a member positioned adjacent said spool member and restrained against rotation, a plurality of permanent magnets carried by one of said members, like poles of said magnets being in contact with one another, a member of non-magnetic electrically conductive material carried by the other of said members and having a portion disposed adjacent said magnets, said magnets cooperating with said electrically conductive member to produce eddy currents therein and thereby exert a braking force on said spool member.

12. A fishing reel provided with a hysteresis brake for minimizing overrunning of the reel, said reel comprising a spool member, means for rotatably supporting said spool member, a member positioned adjacent said spool member and restrained against rotation, a plurality of horseshoe permanent magnets carried by one of said members, like poles of said magnets being substantially in contact with one another, a member of electrically conductive material carried by the other of said members and having a portion disposed adjacent said magnets, said magnets cooperating with said electrically conductive member to produce eddy currents and thereby exert a braking force on said spool member.

13. A fishing reel assembly comprising a spool and a hysteresis brake for controlling rotation of the spool, said brake comprising an electrically-conducting rotatable element and a series of normally stationary permanent magnets cooperating with said rotatable element, said spool and said rotatable element being separable as a unit from said permanent magnets.

14. A fishing reel assembly comprising a spool and a hysteresis brake for controlling rotation of the spool, said brake comprising a rotatable, electrically-conducting element and a series of normally stationary permanent magnets cooperating with said rotatable element, said rotatable element and said spool being rigidly connected, and adjustable means holding said spool and rotatable member in position with respect to said permanent magnets whereby said spool and rotatable member may be readily removed from said assembly.

15. A fishing reel comprising a spool and a hysteresis brake positioned between two oppositely disposed stationary housings, said brake comprising a rotatable member connected to said reel and a normally stationary permanent magnet member and adjustable means holding said housings, spool and brake in position with respect to one another and permitting easy removal of said spool and rotatable member from said permanent magnet member.

ROBERT B. RANSOM.